June 15, 1943.　　　L. T. ELIEL　　　2,321,902
METHOD OF DETERMINING SCALE OF AERIAL
PHOTOGRAPHS FOR MAP MAKING
Filed April 12, 1940　　　2 Sheets-Sheet 1
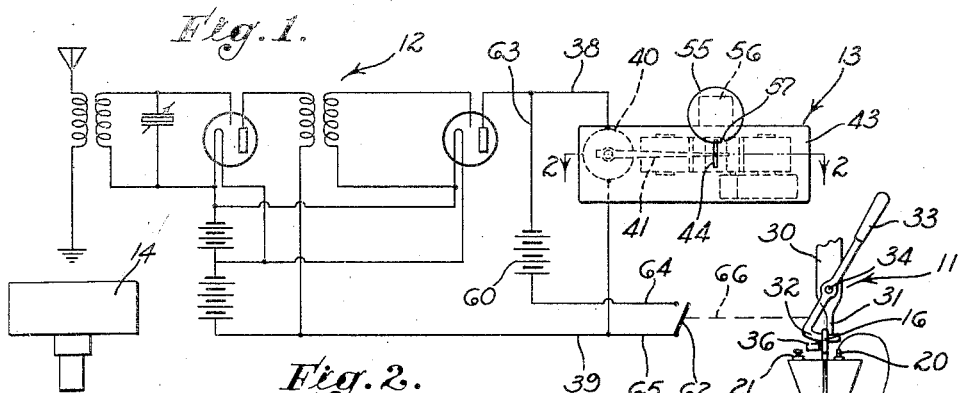
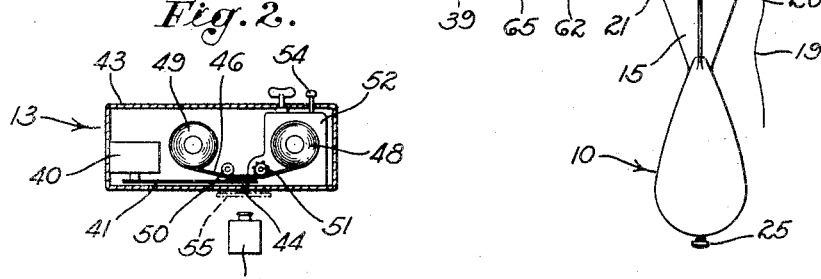
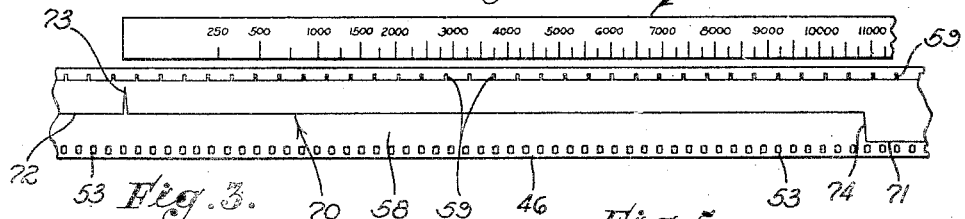
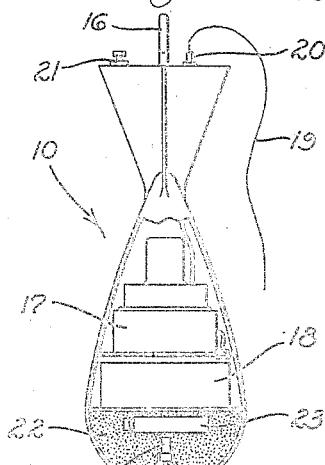
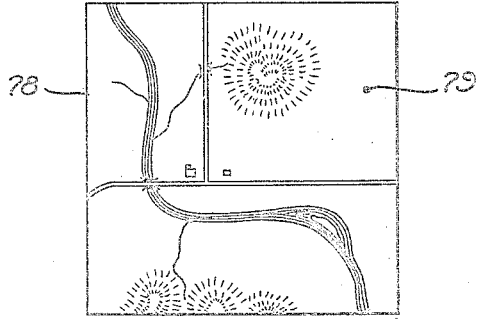
INVENTOR
LEON T. ELIEL
BY HARRIS, KIECH, FOSTER & HARRIS
FOR THE FIRM
ATTORNEYS.

June 15, 1943.                     L. T. ELIEL                     2,321,902
                  METHOD OF DETERMINING SCALE OF AERIAL
                       PHOTOGRAPHS FOR MAP MAKING
                          Filed April 12, 1940            2 Sheets-Sheet 2
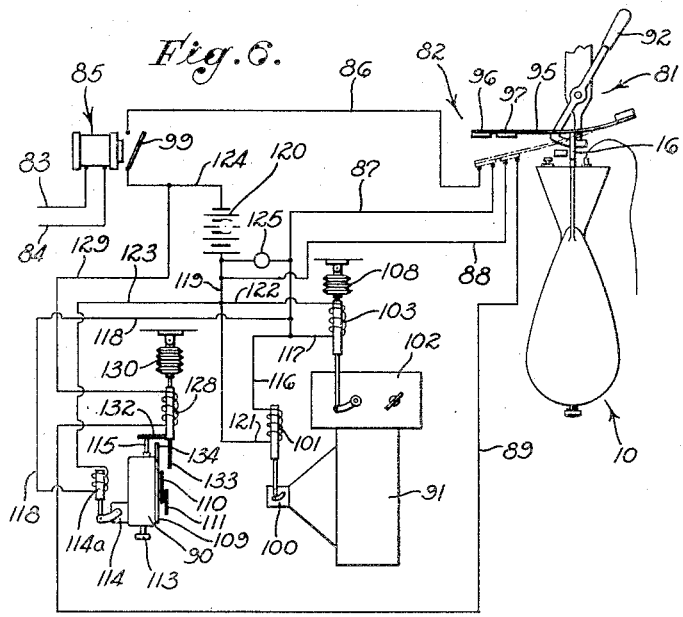
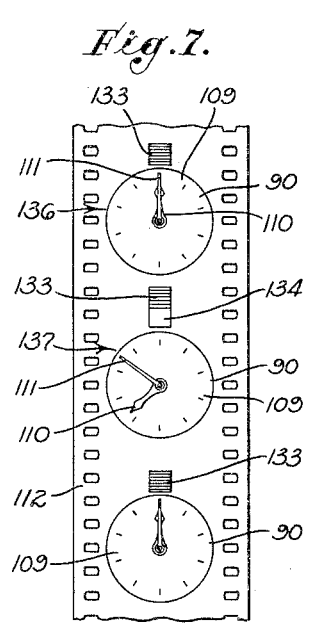
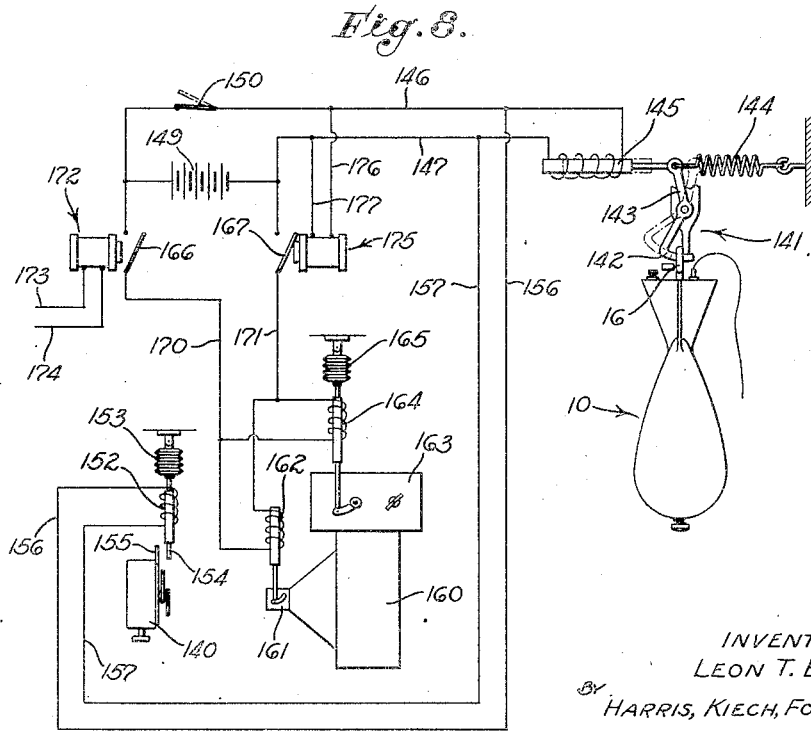
INVENTOR
LEON T. ELIEL
BY HARRIS, KIECH, FOSTER & HARRIS
ATTORNEYS.

Patented June 15, 1943

2,321,902

UNITED STATES PATENT OFFICE 2,321,902

METHOD OF DETERMINING SCALE OF AERIAL PHOTOGRAPHS FOR MAP MAKING

Leon T. Eliel, Pasadena, Calif., assignor to Fairchild, Polley & Eliel, Inc., Los Angeles, Calif., a corporation of California Application April 12, 1940, Serial No. 329,312

6 Claims. (Cl. 33—1)

My invention relates to aeronautics, with special reference to aerial navigation and mapping, and, more particularly is directed to a method and apparatus for ascertaining during flight the elevation above ground of an aircraft.

Approximation of terrain clearance or the vertical distance from an aircraft to the terrain below is sufficient when safety alone is the consideration, as when a pilot is forced to fly blind over unidentified terrain; but accurate knowledge of the vertical distance is essential for calculating the scale of aerial maps and is essential also in wartime for achieving accuracy in bombing objectives from great heights.

The older and most widely practiced method of arriving at terrain clearance of an aircraft is to subtract the known altitude above sea level of the terrain from a barometric reading of altitude on the aircraft. This method is of limited service in blind flying where the pilot is sure of his course and position on the course, but it is valueless if the blind flying is over unknown terrain; for example, when a pilot is carried off his course and lost in a storm. Even under the most favorable conditions the method may not be sufficiently accurate for mapping because atmospheric pressure changes with the weather and because barometers and aneroids at best indicate only approximate distances above sea level.

Because it is necessary to identify terrain points below the aircraft and then to ascertain the altitudes of the identified terrain points, this older method often involves prolonged map study even when the terrain is familiar to the pilot. Under the stress of wartime flying, a pilot may not have opportunity during flight for adequate study of maps at hand, and often enough maps of enemy terrain are not available. Again in pioneer aerial mapping over unexplored terrain, the absence of maps with adequate altitude data precludes the practice of this older method.

A more recent method of ascertaining terrain clearance is to employ a method characterized by directing radio waves from an aircraft against the terrain for reflection back to the aircraft. The relatively great transmitting power required limits this particular method in practice to a maximum range of 4000 feet. This limitation is tolerable when the method is to be used for safety in flight only, but it prevents widespread application of the method to aerial photography since photographic mapping is commonly practiced at flight levels well over 10,000 feet terrain clearance and wartime flying for mapping or bombing enemy terrain is usually conducted far above 4000 feet terrain clearance.

The general object of my invention is to provide a method of ascertaining terrain clearance accurately and quickly from any height by a physical procedure without the necessity for any maps or other data of the terrain below. Broadly described, my method is characterized by the steps of dropping an object to the terrain from the elevated level of the aircraft, timing the fall of the object, and computing the vertical distance involved from the duration of the fall.

One group of objects of my invention relate to the apparatus itself employed for ascertaining the terrain clearance. My objectives include dependability and simplicity of operation, accuracy with minimum errors from mechanical sources, largely automatic operation with minimum burden on the pilot, prompt visual indication of the elapsed time of a fall, and permanent recording of the elapsed time for subsequent use.

Another group of objects in mind relates to the practice of my invention in map-making procedures. One of these objects is to derive terrain clearance data at the time of making an aerial photographic exposure, the data being available for subsequent calculations to arrive at the scale of the photographic image. A further object in the map-making procedure is to locate on the terrain the precise point at which terrain clearance is measured so that the identified point may be used as an altitude reference. For example, other altitudes on the terrain may be derived from comparison with such a reference point by stereoscopic methods. With reference to this last object my invention is characterized by the concept of employing a falling object that makes a visual signal upon impact with the earth and then photographing the terrain to include the visual signal.

Other objects and advantages of my invention will be apparent from the more detailed description to follow, taken with the accompanying drawings.

In the drawings which are to be taken as illustrative only:

Fig. 1 is a representation of one form of my apparatus, the representation being partly diagrammatic and partly in side elevation;

Fig. 2 is a transverse section of a portion of my apparatus taken as indicated by the line 2—2 of Fig. 1;

Fig. 3 is an enlarged view in side elevation of the preferred form of falling object employed in the practice of my invention;

Fig. 4 is a face view of a record film produced in the operation of the apparatus, the film being shown as a positive for convenience of illustration;

Fig. 5 is an aerial photograph revealing a visual signal produced by impact of the falling object with the earth;

Fig. 6 is a view of the same character as Fig. 1 indicating the construction of a second form of my invention;

Fig. 7 is a face view of a record strip produced by the apparatus of Fig. 6; and Fig. 8 is a view of the same character as Fig. 6 showing a third embodiment of my invention.

My invention may be practiced in any manner that affords an opportunity to time the fall of an object from an airplane to the terrain below. For example, a simple procedure may consist of the pilot dropping some suitable object by hand, visually following the course of the dropped object, timing the fall by means of a stop watch, and then calculating the length of the fall by the observed duration. I prefer, however, to employ by means of suitable apparatus some timing procedure that is largely automatic because such a procedure places little or no burden on the operator and reduces the likelihood of error. Fig. 1 indicates the construction of an apparatus for this purpose.

The principal elements of the apparatus or system depicted by Fig. 1 are: an object generally designated 10 that is suitable for dropping to the earth; a release mechanism generally designated 11 for dropping the object; a radio receiver represented by a conventional circuit generally designated 12; a timing mechanism or indicator generally designated 13; and an aerial camera 14.

What my be called the "free-falling" characteristic of the object 10 must be known for accurate results. In other words, air resistance determined by the configuration of the object 10 will cause the object to fall to the terrain at a slower rate than the object would fall in a vacuum. The free-falling characteristic may be expressed in a formula for the rate of fall of the object or may be inherent in a table or curve that is derived either empirically or by calculation.

The one essential function of the object 10 is simply that it may be adapted to fall to the earth in a predictable manner. In the preferred form of my invention, however, the object 10 is adapted to transmit radio waves continuously during its fall to permit automatic timing, and the object is furthermore adapted to produce some type of signal readily visible from the aircraft to indicate the point of impact with the ground. While such a visual signal may be produced mechanically, I prefer simply to produce a smoke cloud by combustion when the object strikes the earth. The preferred form of the object 10, then, shown in Figs. 1 and 3, is adapted for explosive combustion and may be conveniently referred to as a "timing bomb."

The timing bomb 10 is of streamline configuration with trailing fins or tail members 15 and an eye 16 at its trailing end for suspension in the release mechanism 11. The interior of the bomb houses a radio transmitter 17 and a battery 18 for the transmitter, the transmitter being adapted to energize a transmitting aerial 19 in the form of a wire extending from an insulator bushing 20. For controlling the operation of the transmitter a suitable switch 21 may be provided. The construction of such a transmitter of small weight and small volume presents no difficult problems and may be patterned largely on the transmitters now employed on small balloons for automatically broadcasting meteorological data. The nose of the timing bomb 10 contains a body 22 of mildly explosive material. To favor the formation of a readily visible smoke cloud when the bomb strikes the earth, a bottle 23 of some suitable chemical may be placed in the bomb to be broken and scattered by the explosion of the material 22. A detonator 24 surrounded by the explosive material 22 is adapted to be set off by a suitable plunger 25 at the nose of the bomb, the plunger being normally held in extended position by a suitable spring 26. A manually removable pin 27 may be inserted in a suitable diametric bore in the plunger 25 to prevent accidental detonation, the pin being manually removed when the bomb is placed in the release mechanism 11.

The bomb release mechanism 11 may be any suitable device for suspending the bomb 10 from an aircraft in a releasable manner. The particular release mechanism 11 shown in Fig. 1 is carried by a downwardly extending bar 30 that is rigid with the aircraft. The bar 30 terminates in a finger 31 that cooperates with a hook 32 in releasably retaining the timing bomb, the hook engaging the previously mentioned eye 16. The hook 32 is an extension of a manual release lever 33 that is mounted on the bar 30 by a suitable pivot 34. To serve as a stop to prevent the eye 16 from following the lateral opening movement of the hook 32, any suitable stop means may be employed such as a crossbar 36 just below the hook 32.

The responsive energy of the radio receiver 12 is delivered to a pair of output wires 38 and 39 that terminate in the timing device 13. The function of the timing device 13 may be to indicate at once for the benefit of the pilot the falling interval of a timing bomb, or may be to make a permanent record of the elapsed time, or may be both to indicate and record the time. The particular timing device 13 shown in Figs. 1 and 2 is designed primarily for map-making purposes and makes a record of the time interval without simultaneously indicating the time to the operator.

Such a timing device may consist of an ammeter 40 energized by the radio output wires 38 and 39 in combination with means to record on a moving strip the movements of a pointer or hand 41 that is responsive to the ammeter. The ammeter is housed in a dark-box 43 with the pointer 41 disposed across a slit 44 in the dark-box, and a lamp 45 directs light into the slit 44 to cast the shadow of the ammeter pointer 41 onto a photographic film 46. The film 46 is wound onto a spool 48 from a spool 49 and is held in an exposure plane close to the pointer 41 by a pair of spaced rolls 50 and 51. The movement of the film is derived from a spring-driven motor 52 that is frictionally connected with the spool 48 and positively connected with the roll 51, the roll 51 being adapted to rotate at constant speed and having sprocket teeth to engage sprocket holes 53 in the film (Fig. 4). Conveniently located for the operator is a control plunger 54 for the spring-driven motor 52, which plunger may be adapted to release the motor for operation when pushed inward and to stop the motor when pulled outward.

Since film may change in length, especially during development, means may be provided to record time intervals on the film whereby time represented by the film movement may be accurately ascertained regardless of changes in the film length prior to time calculation. For this purpose I provide a rotary disc 55 overlapping an end portion of the light slit 44, the rotary disc being driven by a spring motor 56 at a constant rate of one revolution per second. Normally, the disc shortens the effective length of the light slit 44, but once each second a peripheral notch in the disc registers with the light slit to unmask the light slit to full length. As a result, the light pattern of the positive film in Fig. 4 is a wide band 58 with tooth-like projections 59 representing intervals of one second. By measuring time on the film in terms of these space intervals any error that might arise from change in length of the film is obviated.

For automatic operation of the system in the determination of the height of the aircraft from terrain, the timing device 13 should have some operative relationship to the release mechanism 11, since the timing interval begins with the release of the timing bomb. The required relationship may be achieved simply by placing an auxiliary battery 60 and a switch 62 in parallel with the ammeter 40 across the output wires 38 and 39 and mechanically connecting the switch 62 with the release mechanism 11. As indicated in Fig. 1 the battery 60 is connected to the wire 38 by a wire 63 and on the other side is connected to one terminal of the switch 62 by a wire 64, the other terminal of the switch being connected to the wire 39 by a wire 65. The dotted line 66 represents some suitable mechanical connection between the release hook 32 and the switch 62. It is contemplated that the operator will swing the release lever 33 downwardly in a vigorous manner to release the timing bomb 10 and that in the course of such release movement the operative connection 66 will cause the switch 62 to close momentarily and then open.

The operation of this first form of my invention may be readily understood by referring to Fig. 4 showing a portion of the film 46 that has been developed to bring out a record of a falling interval. For convenience of illustration in black and white the film 46 in Fig. 4 is depicted as a positive print instead of a negative that would be used in practice.

Since the film is positive, the light band 58 with its projections 59 is white and the shadow of the ammeter pointer 41 is represented by a black line 70 on the white band. When the ammeter 40 is deenergized, the pointer 41 rests at a position near one end of the light slot 44 and therefore causes the black line to be traced on the light band 58 near one edge of the light band. In Fig. 4 wherein the record is to be read from left to right, the end of the record shows the black line 70 dropped to a low level at 71 representing the deenergized position of the ammeter pointer.

In a typical procedure the operator places one of the timing bombs 10 in the release mechanism 11, initiates operation of the transmitter 17 in the timing bomb by manipulating the switch 21 and tunes in the receiver 12 on the aircraft. After the receiver reaches a normal level of output through the ammeter 40, the operator presses the control plunger 54 to start movement of the film 46, whereupon the ammeter causes the black line 70 to be traced at an intermediate level on the film, as indicated at 72 in Fig. 4. When the operator releases the timing bomb 10 by a vigorous opening movement of the release lever 33, additional current from the auxiliary battery 60 momentarily surges through the ammeter 40 to swing the ammeter pointer to a relatively high level, and as a result the line 70 on the developed film swings to a peak 73, and then returns to the intermediate level 72 for the duration of the fall. When the timing bomb 10 strikes the earth impact causes the transmitter 17 to fail and immediately the ammeter is deenergized to produce an abrupt drop in the line 70 shown at 74 in Fig. 4.

Since the duration of the fall as recorded on the film 46 it is to be measured from the point at which the line 70 initially rises to the peak 73 to the point at which the line 70 initially swerves to make the abrupt drop 74, it is apparent that neither the sharpness of the peak 73 nor the abruptness of the drop 74 is a factor in the accuracy of the time reading. It is apparent, then, that the switch 62 may be closed long enough to form a plateau instead of the peak 73 and may in fact remain closed throughout the duration of the fall since the result of keeping the switch 62 closed would be merely to have the drop 74 appear at a higher level.

When the film is subsequently developed at the termination of a flight, the duration in seconds of the fall of the object 10 may be read directly from the film 46 by employing as measuring units the intervals indicated by the lateral projections 59 of the light band 58, and from the time so derived the vertical distance traversed in the fall of the timing bomb may be readily computed. A shorter procedure consists in applying to the developed film 46 a scale 75 calibrated to the spacing of the light band projections 59 and graduated in terms of vertical direction in feet. As indicated in Fig. 4 the scale 75 is placed with one end at the longitudinal point of the film 46 where the line 70 initially rises to the peak 73 and the distance in feet is read from the point on the scale opposite the longitudinal point of the film at which the abrupt drop 74 of the line 70 appears. The fall of the timing bomb 10 represented by the film record in Fig. 4 is revealed by the scale 75 to cover a vertical distance of 10,800 feet.

A further procedure in the practice of my invention as applied to aerial photography may be understood by considering an aerial photograph 78 shown in Fig. 5. Since the focal length of the camera 14 employed on the aircraft is known, only the vertical distance from the camera to a point on the terrain is required to compute the scale of the photographic image at this point. Usually it is desirable to produce ultimately an aerial photograph or other map representation at some standard scale which may differ from the scale of an original photograph. Knowledge of the scale of a point on a photograph is valuable in many types of map compilation. If a simple mosaic is being made, a ratio factor may be derived from this known scale. If radial control is to be utilized, the known scale is very useful, particularly in the application of the slotted templet method set forth in the Collier Patent No. 2,102,612 and in the Eliel, et al. Patent No. 2,180,406.

If the practice of my invention is to be carried farther to ascertain relative altitudes of points on the photographed terrain, it is necessary to know at what point of the terrain the elevation above ground of the aircraft is taken.

The photograph 78 discloses a signal cloud 79 produced by explosion upon impact of a timing bomb and therefore indicates the point on the photographed terrain to which the vertical distance represented by the timing record is to be applied. The scale of a random terrain point is a great help in compiling a contour map, and fixes the horizontal and the relative vertical scale, although to know absolute height above set level some other means must be employed. It is not necessary to know the absolute height above sea level of terrain to prepare adequate maps for military purposes, for example. To ascertain the altitudes of other points on the terrain relative to the impact point 79, the images of successive overlapping photographs are correlated to produce a stereoscopic image revealing relative altitudes. By well known mapping methods, such a stereoscopic image may be employed to calculate relative altitudes and to locate contours accurately, the scale of the stereoscopic image being known.

In the practice of a second form of my invention represented by Figs. 6 and 7, I propose to afford the pilot or operator an immediate reading of the falling time of a bomb and to make the timing and recording of a fall fully automatic, leaving to the pilot or operator merely the task of handling the successive timing bombs to be dropped from the aircraft.

The principal elements of the system shown in Fig. 6 are: a bomb-release mechanism 81; a mechanical switch generally designated 82 associated with the release mechanism; an output circuit of a radio receiver on the aircraft, the output circuit being represented by wires 83 and 84; a relay 85 in series with wires 83 and 84; a main timing circuit represented by wires 86 and 87; an auxiliary timing circuit represented by wires 88 and 89; a clock 90 for timing the falling intervals; and a camera 91 for photographing the clock.

The release mechanism 81 is substantially the same as the previously described release mechanism 11, being manually operated by a lever 92 corresponding to the lever 33 of Fig. 1.

The mechanical switch 82 that is associated with the release mechanism 81 includes a flexible switch arm 95 having two spaced and insulated bridging contacts 96 and 97. When a timing bomb 10 is engaged by the release mechanism 81, the eye 16 by which the bomb is engaged presses upward to flex the switch arm 95 upward and thereby hold the switch 82 open. When a timing bomb is released by the mechanism 81 the switch arm 95 returns to its normal closed position at which the bridging contact 96 interconnects the wires 86 and 87 of the main timing circuit and the bridging contact 97 interconnects the wires 88 and 89 of the auxiliary timing circuit.

The relay 85 includes a switch member 99 in the main timing circuit that is normally open when the relay is deenergized. It is apparent that the main timing circuit is closed only when the relay 85 is energized and simultaneously the mechanical switch 82 is closed.

The camera 91 is equipped with a shutter 100 operated by a solenoid 101 and the shutter is adapted to open momentarily for a photographic exposure whenever the solenoid operates in one direction upon energization or operates in the opposite direction upon deenergization. The camera 91 is also provided with a spring-actuated motor 102 for winding film between exposures by the shutter 100, the motor being controlled by a solenoid 103. Since exposures are made both upon energization and deenergization of the shutter solenoid 101, it is required that film be advanced in the camera both upon energization and upon deenergization of the film solenoid 103, but the arrangement must be such that the film movement occurs only after an exposure operation by the shutter. The required time sequence of the film movement may be achieved by providing for lost motion in both directions of operation of the mechanism controlled by the film solenoid 103 and by further providing for retardation in the operation of the film solenoid in both directions. For such retardation I may employ an apertured bellows 108 of a familiar type that is operatively connected to the film solenoid 103 to exert a dashpot effect.

The clock 90 may have a circular scale 109 having one hundred graduations to represent seconds with respect to a clock hand 110 and to represent hundredths of a second with respect to a longer clock hand 111, the hand 110 advancing one graduation per second and the longer hand 111 making a complete revolution in a second. The face of the clock appears in the photographic film 112 shown in Fig. 7. Conceivably, the clock scale may express feet in terrain clearance. The clock preferably is provided with a continuously running spring-driven motor (not shown) energized by a manual key 113, the hands being adapted to be actuated by the motor only when a clutch 114 of the clock is in engagement. The clutch 114 is operatively connected to a solenoid 114a and is normally out of engagement with the solenoid 114a deenergized. Whenever the solenoid 114a is energized it holds the clutch 114 in engagement to cause the hands 110 and 111 to be advanced by the clock motor. In my preferred construction the clock hands are adapted to maintain whatever position the hands attain at the end of a timing interval, but the hands are brought back to their zero positions upon subsequent depression of a clearing plunger 115 at the top of the clock.

The shutter solenoid 101, the film solenoid 103, and the clutch solenoid 114a are all arranged in parallel in the main timing circuit. The necessary connections include three wires branching from the main circuit wire 87, a first wire 116 to the shutter solenoid, a second wire 117 to the film solenoid, and a third wire 118 to the clutch solenoid 114a. A wire 119 from one terminal of a battery 120 has three corresponding branches, wires 121, 122, and 123 leading respectively to the shutter solenoid, the film solenoid, and the clutch solenoid. To complete the main timing circuit, a wire 124 interconnects the battery 120 and the switch member 99 of the relay 85.

Preferably, some means is included to indicate visually to the operator when the main timing circuit is energized. Such means may comprise simply a signal lamp 125 in a shunt across the wires 87 and 119.

The wire 88 of the auxiliary timing circuit extends from the mechanical switch 82 to the wire 119 for communication with one side of the battery 120, and the other wire 89 of the auxiliary circuit extends from the switch 82 to what may be termed a "masking solenoid" 128, the auxiliary circuit being completed by a wire 129 from the solenoid 128 to the wire 124 on the other side of the battery 120. The solenoid 128, which is equipped with an apertured belolws 130 for delayed action, has two functions, first, to actuate the clearing plunger 115, and, second, to actuate some means for indicating when energization of the main timing circuit is caused by the release of a timing bomb and therefore represents an interval of time upon which an altitude calculation is to be based. The first of these functions may be provided by mounting on the movable part of the solenoid 128 a finger 132 positioned to depress the clearing plunger 115 at the end of a deenergization movement of the solenoid. The second function may be achieved, for example, by mounting a signal member 133 on the movable part of the solenoid 128 to move upward with energization of the solenoid and downward when the solenoid is deenergized. In my preferred arrangement the signal member 133 is a metal plate painted black to serve as a mask for a stationary white plate 134 mounted on the clock 90.

When the operator places a timing bomb 10 in engagement with the release mechanism 81 he thereupon causes the switch arm 95 to be flexed upward to open the main timing circuit and the auxiliary timing circuit. Considering the presence of a timing bomb 10 in the engagement mechanism 81 as normal, it is apparent that normally both the main timing circuit and the auxiliary timing circuit are open and all four of the solenoids are deenergized. Before releasing a timing bomb, the operator starts the transmitter in the timing bomb and tunes in the receiver on the aircraft with the result that the switch member 99 of the relay 85 closes. No electrical effect is caused by the energization of the relay at such time because the mechanical switch 82 remains open.

When the operator swings the release lever 92, the release of the timing bomb permits the flexible switch member 95 to move to closed position and instantly both timing circuits are closed. The immediate results of the release of the timing bomb include the energization of the signal lamp 125, the engagement of the clock clutch 114, and the operation of the solenoid 101 to take a picture of the clock 90, the clock being shown at zero time or close to zero time and the signal member 133 being in its lower position to mask the white plate 134. The later effects of simultaneously closing the two timing circuits are the advancing of the photographic film by the retarded operation of the film solenoid 103 and the elevation of the signal member 133 to unmask the white plate 134, the delayed actions being such that the film in the camera is stationary at the new position and the signal member 133 is at its uppermost position within five or six seconds after the two circuits are energized.

When the falling timing bomb is demolished by impact against the earth with consequent destruction of the transmitter therewith, output from the radio receiver on the aircraft through the relay 85 ceases with consequent opening movement of the switch member 99 and deenergization of the main timing circuit, the secondary timing circuit remaining closed. As a result of breaking the main circuit, the clock clutch 114 is disengaged, the shutter solenoid 101 is deenergized immediately to take a second picture of the clock 90 and, with a suitable time lag, the film solenoid 103 on its deenergization movement causes the film in the camera 91 to advance in preparation for a later exposure. The hands of the clock remain fixed after the main circuit is broken so that the pilot may ascertain the time duration of the fall at a glance and derive the vertical distance of the fall directly from the clock scale if the scale is in feet, or by calculation, or by referring to a time table computed on the free-falling characteristic of the type of timing bomb employed.

When the pilot places a succeeding timing bomb 10 in the release mechanism 81, thereby flexing the switch member 95 upward, the auxiliary timing circuit is thereby opened with consequent deenergization of the masking solenoid 128. After a delay of three or four seconds the signal member 133 reaches its lowermost position to mask the white plate 134 and simultaneously the finger 132 depresses the clearing plunger 115 to restore the clock hands to zero position.

It is to be noted that in the above sequence of operations the sole task required of the operator is to manipulate the release mechanism 81, the required successive photographic exposures for ascertaining time intervals being taken automatically. The only precaution required is that the operator defer placing a timing bomb in the release mechanism until after the indicating lamp 125 goes out and then defer release of the bomb for approximately five seconds to permit the delayed action on the part of the masking solenoid.

The strip of developed film 112 in Fig. 7, which is shown as a positive print for convenience of illustration, has an upper image 136 that shows the clock 90 at zero position with the signal member or mask 133 in its lower position. A second image 137 immediately below the image 136 shows the clock with the hands advanced to represent a substantial time interval and also shows the signal member 133 in its upper position unmasking the white plate 134.

The signal plate or mask 133 is included in the arrangement to identify pairs of successive images on the record film that represent falling intervals of timing bombs and to distinguish such significant pairs of images from images that might be made accidentally. If an operator starts the transmitter of a timing bomb before placing the bomb in the release mechanism, the relay 85 may respond by closing the main signal circuit, a first accidental photograph being taken when the main circuit is closed and a second accidental photograph being taken when subsequently the operator places the transmitting bomb in the release mechanism. The first accidental image would show the mask at its upper position and probably would show the hands of the clock at advanced positions. The succeeding accidental image would show the hands of the clock at still further advanced positions and would again show the mask in its upper position. It is generally possible to identify the significant images on a developed film solely by comparing the various images with reference to the positions of the clock hands, but the selection of the significant images is greatly facilitated by also noting the positions of the mask in the various images. Confusion can arise only if the operator places a timing bomb in the release mechanism or otherwise opens the mechanical switch 82 while a timing bomb is falling through the air. This source of confusion cannot arise if the operator waits through each falling period until the lamp 125 goes out. Otherwise, the image of a clock at zero with the mask down, followed by an image with the clock advanced and the mask up may be depended upon as representing the fall of a timing bomb.

The system represented by Fig. 6 may be employed by a pilot to explore the profile of terrain traversed by the ship when the pilot is flying blind. To explore the profile of the terrain the pilot holds his ship to a given altitude as determined by his aneroid and releases successive timing bombs, say, at one minute intervals. Without taking time to calculate the vertical air distances involved, he may simply note the relative magnitudes of the time readings to deduce therefrom the profile of the underlying terrain. Progressively increasing falling intervals would clearly indicate sloping of the terrain downward in the line of flight; progressively decreasing readings would denote the opposite; constant values would indicate relatively flat terrain or a body of water; and irregular sequence would clearly suggest broken country as well as positively indicate land as distinguished from water. If the readings are jotted down and the ground speed estimated, the operator may go so far as to derive the actual slope of the terrain. In any case a series of successive readings will give a definite clue to the character of the terrain and the clue may be sufficient guidance for the operator to change his course intelligently.

If the pilot is lost and desires to know how far he can safely descend he may drop a number of timing bombs at intervals, as he descends, and when he gets as low as he can safely go, based on the ground clearance determined from the previously released timing bombs, he may turn 180° to retrace his course at the lowest safe elevations over the area probed by the released timing bombs in an attempt to get under the ceiling.

In a third practice of my invention represented by Fig. 8, I contemplate employing a relatively simple continuously running spring-wound clock 140 in combination with means for automatically photographing the clock as required for the calculation of falling periods of successive timing bombs. The arrangement is simpler than the arrangement of Fig. 6, in that the clock is not complicated by any electrical controls whatsoever.

In Fig. 8 a release mechanism generally designated 141 includes a hook 142 on a latch-lever 143, the hook being adapted to releasably retain one of the previously described timing bombs 10. A spring 144 connected to the latch-lever 143 urges the latch lever to the open or bomb-releasing position of the lever, but is not strong enough to prevent a solenoid 145 from holding the latch-lever in closed position whenever a latching circuit represented by wires 146 and 147 is closed. The latching circuit is energized by a suitable battery 149 and is controlled by a latching switch 150.

Associated with the clock 140 is a masking solenoid 152 corresponding to the previously described masking solenoid 128. The masking solenoid 152 operates in a retarded manner by virtue of an apertured bellows 153 and carries a mask 154 that drops in front of a white plate 155 when the solenoid is deenergized. The masking solenoid 152 is placed in shunt across the latching circuit by a wire 156 connected to the wire 146 and a wire 157 connected to the wire 147.

In proper position for photographing the clock 140 is a camera 160 that corresponds to and is operated in the same electrical manner as the previously described clock 91. The camera 160 is equipped with a shutter 161 that is operated by a solenoid 162, the shutter being adapted to open momentarily for a photographic exposure whenever the solenoid is either energized or deenergized. The camera 160 is also provided with a spring-actuated motor 163 for winding film between exposures by the shutter 161, and the motor 163 is controlled by a film solenoid 164, the film solenoid being retarded in its movement by an apertured bellows 165. In the same manner as previously described, the film in the camera 160 is advanced for a new exposure whenever the film solenoid 164 is either energized or deenergized, the apertured bellows 165 causing the film movement to lag behind operation of the shutter solenoid 162.

In the arrangement represented by Fig. 8 I contemplate employing a timing circuit in which the two solenoids 162 and 164 are in parallel and in which a switch member 166 and a second switch member 167 are in series to control the operation of the two solenoids. Such a timing circuit may include a wire 170 from one terminal of the battery 149 branching to each of the solenoids 162 and 164, and a second wire 171 from the other terminal of the battery branching to the two solenoids, the wire 170 being broken by the switch member 166 and the wire 171 being broken by the switch member 167. The switch member 166 is part of a relay 172 in the output circuit of a radio receiver on the aircraft, which output circuit is represented by wires 173 and 174. The switch member 166 opens and closes with energization and deenergization respectively of the relay 172. The switch member 167 is part of a second relay 175 that is placed in shunt across the latching circuit by two wires 176 and 177 connected respectively to wires 146 and 147. The switch member 167 seeks a closed position when the latch circuit is open, but is moved to open position by energization of the relay 175.

In the normal procedure, the operator places a bomb in engagement with the hook 142 of the release mechanism 141 and closes the latching switch 150 to energize the latch solenoid 145 and thereby hold the hook in engaging position to retain the bomb. Since the masking solenoid 52 is in parallel with the latch solenoid 145, closing the latching switch 150 causes the mask 154 to be shifted to its upper position. It is contemplated that the transmitter in the bomb will be deenergized prior to engagement by the release mechanism, and that the transmitter of the bomb will be energized immediately after the timing bomb is so engaged. In such a procedure the timing circuit of Fig. 8 is open prior to the placing of the timing bomb in the release mechanism, because at such time the relay 172 of the receiver circuit is deenergized and the switch member 166 of the timing circuit is in open position. The engagement of the timing bomb while the output circuit of the receiver is deenergized causes the second switch member 167 to open, the position of the various elements then being as indicated in Fig. 8. When the transmitter is thereafter energized, the switch member 166 in the relay 172 is drawn to closed position, but closing of the switch member 166 under such circumstances does not close the timing circuit because the switch member 167 remains open so long as the latching circuit is energized. After the switch member 166 closes, the timing bomb may be released at the operator's discretion by simply opening the latch switch 150 to break the latching circuit and thereby permit the spring 144 to swing the latch lever 173 to open position.

As soon as the latch circuit is broken to release the timing bomb, the deenergization of the relay 175 permits the switch member 167 to move to a closed position, thereby closing the timing circuit. Closing of the timing circuit causes instantaneous operation of the camera shutter and delayed operation of the film advancing mechanism. The breaking of the latch circuit deenergives the solenoid 152 to permit the mask 154 to move downward, but the downward movement of the mask is delayed by the bellows 153 so that tne operation of the camera shutter in response to closing of the timing circuit results in a picture of the clock 140 while the mask is still at its upper position. When the radio transmission terminates upon impact of the timing bomb with the ground, the relay 172 is deenergized whereupon the switch member 166 moves to open position to break the timing circuit. Breaking of the timing circuit causes instantaneous operation of the shutter 161, delayed operation of the film advancing mechanism 163, and retarded fall of the mask 154.

It is apparent that a picture of the clock 140 representing the beginning of a falling period will show the mask 154 in its upper position and a subsequent picture at the end of a falling period will show the mask in its lower position. A comparison of the two clock readings will represent the duration of the falling period. Preferably the clock has a dial, as previously described, showing a time span of one hundred seconds with one hand indicating seconds and another hand indicating hundredths of a second.

The selected practices and forms of my invention described herein in detail for the purpose of disclosure and to illustrate the principles involved will suggest to those skilled in the art various changes, modifications, and substitutions that do not depart from my underlying inventive concept, and I reserve the right to all such changes, modifications, and substitutions that properly come within the scope of my appended claims.

I claim as my invention:

1. A method of obtaining from an aircraft an aerial photograph that may be used for obtaining measurements of terrain below characterized by the employment of an object adapted to produce a photogenically perceptible signal upon impact with the ground, said method including the steps of: dropping said object to the earth from the aircraft; timing the duration of the fall of said object; photographing the terrain from the aircraft after said impact to obtain an image of the terrain including said photogenically perceptible signal; computing from the duration of said fall the vertical distance from the point at which the photograph is made to the point of impact of said object on the terrain; and computing the scale of the photograph from said vertical distance and the focal length of the camera.

2. A method of obtaining from an aircraft measurements of the terrain below characterized by the employment of a camera and an object adapted to produce a photogenically perceptible signal upon impact with the ground, said method including the steps of: dropping said object to the earth from the aircraft; timing the duration of the fall of said object; photographing the terrain from the aircraft after said impact to obtain an image of the terrain including said photogenically perceptible signal; computing from the duration of said fall the vertical distance from the point at which the photograph is made to the point of impact of said object on the terrain; computing the scale of the photograph from said vertical distance and the focal length of the camera; and measuring distances on the photograph in accord with said scale.

3. An aerial mapping method characterized by the employment of an object adapted to produce a photogenically perceptible signal when dropped against the earth, and the employment of a camera of known focal length, said method including the steps of: dropping the object to the underlying terrain from an elevated level; timing the duration of the fall of said object; computing from the duration of said fall the vertical distance from said level to the point of impact of said object with the terrain; employing said camera at spaced photographic points substantially at said elevated level to obtain two successive photographs of the terrain overlapping in the region of the impact of said object with the terrain and including an image of the signal produced by said impact; computing the scale of said photographs from said vertical distance and said focal length; forming a stereoscopic image of the terrain of known scale by employing said two photographs at a spatial relationship corresponding to the spatial relationship of said photographing points at said elevated level; and measuring distances on said stereoscopic image in accord with said known scale.

4. An aerial mapping method characterized by the employment of an object adapted to produce a photogenically perceptible signal when dripped against the earth, and the employment of a camera of known focal length, said method including the steps of: dropping the object to the underlying terrain from an elevated level; timing the duration of the fall of said object; computing from the duration of said fall the vertical distance from said level to the point of impact of said object with the terrain; employing said camera at spaced photographic points substantially at said elevated level to obtain two successive photographs of the terrain overlapping in the region of the impact of said object with the terrain and including an image of the signal produced by said impact; computing the scale of said photographs from said vertical distance and said focal length; forming a steroscopic image of the terrain of known scale by employing said two photographs at a spatial relationship corresponding to the spatial relationship of said photographing points at said elevated level; and measuring the altitude of other points on the terrain relative to said impact point by measuring in said stereoscopic image vertical distances of said other points from the vertical image in accord with said known scale.

5. A method of obtaining from an aircraft an aerial photograph that may be used for obtaining measurements of terrain below characterized by the employment of a time-indicating means and an object adapted to produce a photogenically perceptible signal upon impact with the ground, said method including the steps of: dropping said object to the earth from said aircraft; photographing said time-indicating means in the course of the fall of said object to obtain a record of the duration of the fall; photographing the terrain from the aircraft after impact of said object to obtain an aerial photograph of the terrain including said signal; computing from the duration of said fall the vertical distance from the aircraft to the point of impact of said object; and computing the scale of the terrain photograph from said vertical distance and the focal length at which the terrain photograph is taken.

6. A method of obtaining from an aircraft an aerial photograph of terrain that may be used for obtaining measurements on the terrain characterized by the employment of an impact-explosive bomb having a known free-falling characteristic, said method including the steps of: dropping said bomb to the earth from said aircraft; timing the duration of the fall of the bomb; photographing the terrain from the aircraft after said impact to obtain an image of the terrain including an image of the explosion products of the bomb to identify the point of impact; computing the vertical distance of said fall from the duration of the fall and said free-falling characteristic of the bomb; and computing the scale of said photograph from said vertical distance and the focal length at which the photograph is taken.

LEON T. ELIEL.

CERTIFICATE OF CORRECTION.

Patent No. 2,321,902.                                                      June 15, 1943.

LEON T. ELIEL.

It is hereby certified that error appears in the printed specification of the above numbered patent requiring correction as follows: Page 2, first column, line 39, for "my" read --may--; page 3, second column, line 15, strike out "it"; page 4, first column, line 9, for "set" read --sea--; page 7, first column, line 9-10, for "deenergives" read --depnergizes--; and second column, line 34, claim 4, for "dripped" read --dropped--; and that the said Letters Patent should be read with this correction therein that the same may conform to the record of the case in the Patent Office.

Signed and sealed this 27th day of July, A. D. 1943.

(Seal)                                             Henry Van Arsdale,
                                                        Acting Commissioner of Patents.